(12) United States Patent
Anandan (10) Patent No.: US 8,496,367 B2
(45) Date of Patent: Jul. 30, 2013

(54) SUPPRESSION OF COLOR MIXING IN UV LED BASED COLOR PIXEL BACKLIGHT FOR LIQUID CRYSTAL DISPLAY

(76) Inventor: Munisamy Anandan, Austin, TX (US)

( * ) Notice: Subject to any disclaimer, the term of this patent is extended or adjusted under 35 U.S.C. 154(b) by 177 days.

(21) Appl. No.: 13/065,018

(22) Filed: Mar. 11, 2011

(65) Prior Publication Data

US 2011/0164431 A1    Jul. 7, 2011

Related U.S. Application Data

(63) Continuation-in-part of application No. 12/220,736, filed on Jul. 28, 2008, now Pat. No. 7,934,862.

(51) Int. Cl.
*F21V 7/04* (2006.01)
(52) U.S. Cl.
USPC ............. 362/606; 362/84; 362/231; 362/612; 362/613
(58) Field of Classification Search
USPC ................... 362/84, 231, 606, 612, 613, 616, 362/617, 619
See application file for complete search history.

(56) References Cited

U.S. PATENT DOCUMENTS

| | | | |
|---|---|---|---|
| 4,978,888 A | 12/1990 | Anandan et al. | |
| 5,396,406 A * | 3/1995 | Ketchpel | 362/27 |
| 6,637,905 B1 * | 10/2003 | Ng et al. | 362/601 |
| 7,036,946 B1 | 5/2006 | Mosier | |
| 7,423,296 B2 * | 9/2008 | Chua | 257/98 |
| 7,934,862 B2 * | 5/2011 | Anandan | 362/606 |
| 2005/0057145 A1 * | 3/2005 | Shieh et al. | 313/503 |
| 2005/0194604 A1 * | 9/2005 | Sakuma et al. | 257/98 |

* cited by examiner

*Primary Examiner* — John A Ward (57) ABSTRACT

A ultra-violet based color pixel backlight system for color filter-less Liquid Crystal Display, comprising multiplicity of LEDs, emitting UV or NUV light in the wavelength range of 150 nm to 390 nm, assembled at one edge of a UV transmitting light guide, which has other three edges and bottom surface coated with UV reflecting layer and its top surface etched with UV and NUV extracting pixel patterns that contain phosphors that emit different colors of light in red, blue and green region when excited by UV or NUV light. The etched pixels contain Aluminum islands underneath the phosphor layers to reflect the visible rays generated by the phosphors of the pixel and suppress the visible light leaving the pixel as well as suppress the visible light from adjacent pixel entering the pixel. Thus suppressing the color mixing that could occur without the incorporation of Al islands. LCD without color pixels, a micro-lens sheet and the light guide with color pixels are placed in substantial alignment to provide a color pixel backlight system for LCD. Thus red, blue and green pixels of light from the light guide passes through the intended red, blue and green pixels of the color filter-less LCD, resulting in color pixel backlighting that enhances the optical efficiency of LCD.

19 Claims, 9 Drawing Sheets

SUPPRESSION OF COLOR MIXING IN UV LED BASED COLOR PIXEL BACKLIGHT FOR LIQUID CRYSTAL DISPLAY

BENEFIT OF PRIOR APPLICATION-CONTINUATION IN PART

Application Ser. No. 12/220,736, Filing date: Jul. 28, 2008
Publication # US-2009-008215-A1

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of Invention

This invention belongs to the area of flat panel display and more specifically to the backlight technology for Liquid Crystal Display (LCD). This invention is 'continuation in part' of the invention on 'UV based color pixel backlight for Liquid Crystal Display', application Ser. No. 12/220,736 (Publication # US-2009-008215-A1) filed on Jul. 28, 2008 by the inventor Munisamy Anandan.

LCD does not emit light and hence requires a backlight for its function as a visual display. Backlights based on Cold Cathode Fluorescent lamps (CCFLs) have been employed for backlighting LCDs. Recently Light Emitting Diodes (LEDs) have been employed as light sources for backlighting LCDs. White LEDs are predominantly used in cell phones and digital cameras and recently in lap top computers for backlighting LCDs. Red, Blue and Green LEDs are used in backlighting LCD TV. LCD requires a flat or sheet source of light at its rear side. As LEDs are point sources of light, there is a need to convert the point source of light in to a sheet source of light. This conversion is done through two configurations namely, edge-lit configuration and direct-lit configuration. In an edge-lit configuration, the LEDs are assembled at the edges of a rectangular light guide, usually a polycarbonate slab, and the light from LEDs undergo total internal reflections at the inner surface of light guide and finally get extracted through top surface of light guide facing the back surface of LCD. In the direct-lit configuration, LEDs are assembled inside a box and a diffuser sheet is assembled over the LEDs. Light from LEDs get mixed inside the box and further mixed in the diffuser sheet and finally emanates from the diffuser sheet towards LCD.

Thus a sheet source of light, usually white light, is generated and provided as backlight for LCD. The white light from LEDs contains all three primary colors and the colors are further filtered by color filters incorporated inside LCD for generating good quality of color pictures. It is well known that the color filters absorb 70-80% of incoming light and hence the LCD becomes optically less efficient. This still remains a challenge for the LCD industry.

2. Description of Prior Art

Prior art deals with the elimination of color filters inside LCD and provision of three primary colors of good purity that requires no filtering by the color filters. For example in one prior art (U.S. Pat. No. 4,978,888), Anandan et. al describes the use of flat fluorescent lamp incorporating red, blue and green color phosphors in the form of pixels, for backlighting color filter-less LCD. Red, blue and green color light from the pixilated surface of the flat fluorescent lamp provides individual primary colors of light to the pixels of LCD that does not incorporate color filters. Hence the use of the term 'color pixel backlighting'. The drawback in this prior art is the high ignition voltage in the range of thousands of volts and running voltage in the range of hundreds of volts in addition to thick and massive glass plates employed for the flat light source.

In another prior art (M. J. J. Jack et. al—"Color Separating backlight for improved LCD efficiency", pp. 175-178, Proceedings of 27$^{th}$ International Display Research Conference, 18-20 Sep. 2007, Moscow, Russia; Yoichi Taira et. al, "Low power LCD using a novel optical system", *SID*-02 *Digest*, pp. 1313-1315, 2002; Jyrki Kimmel et. al, "Diffractive backlight grating array for mobile displays", Proceedings of IDRC 2007, pp. 171-174, Moscow, September 2007) the authors describe the use of diffraction grating over the light guide to separate the three primary colors from the white light and employ a sheet of micro-lenses. The diffraction grating-separated three primary colors go through the LCD that has no color filters. The drawback in this prior art is the 'color crosstalk'. That is, light of one color passes through the unintended pixel of LCD where a different colored light is incident. It is clear from the prior art that providing a simple solution for 'color pixel backlighting' for a color filter-less LCD is a challenge.

In yet another prior art (U.S. Pat. No. 7,036,946 B1) Donald E. Mosier describes LCD backlight employing UV LEDs. In this invention, UV light from LEDs is coupled to a light guide and the UV light is made to fall on phosphor coated on the surface of light guide to emit visible light towards the LCD. This invention is completely devoid of the concept of 'color pixel backlighting' and does not deal with LCD without color filters.

A lower wavelength of light when incident on materials like phosphor results in the generation of higher wavelength of light. This is a basic science and known phenomena that is employed in fluorescent lamp for the past 40 years. Another example of lower wavelength light exciting a phosphor is the blue light from LED exciting yellow phosphor coated on the LED chip. This is commonly found in all the white LEDs employed in cell phone backlighting. This basic science is well known. What is not obvious is the innovative ways in which this basic science is exploited to invent new devices. U.S. Pat. No. 7,036,946 B1 by Donald E. Mosier exploits this basic science in inventing a light guide using UV light from LEDs. This invention does not contemplate about the backlighting of color filter-less LCD through the concept of 'color pixel backlighting'. By reading U.S. Pat. No. 7,036,946 B1, it will not be obvious to a person of ordinary skill to envision the concept of color pixel backlighting and exploit the basic science of lower wavelength light exciting a phosphor to invent a light guide that can backlight a color filter-less LCD. The present invention described in the subsequent paragraphs will not fall under the category of 'obviousness'.

In a research paper (N. Ogawa et. al—"Filed sequential color, LCD using organic EL backlighting"—SID Digest of Technical Papers SID International Symposium 1999), N. Ogawa et. al describe organic based electroluminescent backlight that is backlighting an LCD without color filters. This art is based on the field sequential operation of LCD wherein each frame of LCD driving consists of only one color. For example the backlight will provide a sheet of red light to the LCD 60 times per second and the LCD will select red pixels during this period. The next will be green sheet of light from backlight for 60 times a second followed by blue sheet of light. In other words the backlight will provide continuous sheet of light with a frame rate of 60 Hz for each color. This takes place sequentially for each color during which time the desired color pixels will be selected on LCD to generate color images. In this art, there is no 'color pixel backlighting' that takes place continuously. This is totally a different mode of operation and the sequential flashing of color sheet of light on LCD results in Psycho-physical effect that makes display exhibit 'color break-up', a defect that is still to be solved to make any commercial product.

In all the foregoing inventions, it is clear that either the concept of 'color pixel backlighting' is absent or, if present, it has problems for practical implementation and thus there is no simple solution for the challenge posed by 'color pixel backlighting' of color filter-less LCD.

The parent invention, on 'UV based color pixel backlight for Liquid Crystal Display' (Munisamy Anandan—"UV based color pixel backlight for Liquid Crystal Display"—US-2009-008215-A1, application Ser. No. 12/220,736, filed on Jul. 28, 2008) provides a simple solution to the challenge posed by 'color pixel backlighting'. But the parent invention requires an improvement to obtain high color quality of images on LCD screen. The present invention describes this improvement in detail.

BRIEF SUMMARY OF THE INVENTION

According to the present invention, a planar UV and NUV light guide employing UV LEDs or near UV (NUV) LEDs as light sources is described. This unique and innovative light guide provides pixilated three primary colors of lights for backlighting LCD that has no color filters. Both edge-lit and direct-lit light guides are described. The UV or NUV light is injected in to the UV and NUV light guide and the UV or NUV undergoes total internal reflections inside the light guide. The UV or NUV light is extracted through extracting features etched on the surface of light guide that faces the LCD. The UV or NUV extraction features are coated with a thin porous layer of Aluminum over which is coated a layer of red-light emitting phosphor in a red pixel, blue-light emitting phosphor in a blue pixel and green-light emitting phosphor in green pixel. When the extracted UV or NUV falls on the phosphors, corresponding colors of light is generated. The etched features or pattern can be in the form of pixels or stripes. When the light guide is aligned to LCD with its etched features and a coupling micro-lens sheet in between, the pixels of LCD are backlit or illuminated with individual colored lights. Red light from etched pattern of the light guide will fall on the pixel of LCD that is intended to generate red pixels for the image. A similar phenomenon takes place for blue and green colors of light. Thus the color filter-less LCD obtains its intended colored backlight in the form of color pixels of light.

It is an object of this invention to provide color pixel backlighting for a color filter-less LCD using planar UV or NUV light guide that accepts and converts UV or NUV light in to visible light, to enable the LCD to have high optical efficiency.

A further object of this invention is to provide visible color pixel backlighting for a color filter-less LCD through a planar UV and NUV light guide whose edges are assembled with UV or near UV LEDs that inject UV or NUV light in to the light guide in the edge-lit configuration.

Yet another object of this invention is to provide color pixel backlighting for a color filter-less LCD through a planar UV and NUV light guide in the form of a box which contains UV or near UV LEDs assembled in the direct-lit configuration.

Yet another object of this invention is to provide pixilated or striped visible color backlighting for LCD through a planar UV and NUV light guide.

Yet another object of this invention is to provide pixilated or striped visible color backlighting for LCD through a planar UV and NUV light guide to obtain high color gamut on LCD screen through the suppression of color mixing taking place inside the light guide.

BRIEF DESCRIPTION OF DRAWINGS

FIG. 01a is an isometric view of the color pixel backlight that incorporates UV or Near UV LEDs assembled at the edge of the light guide according to the parent invention.

FIG. 01b is a cross-sectional view of two adjacent pixels taken from FIG. 01a.

FIG. 02 is a cross sectional view of two adjacent pixels with illustration of light rays and color mixing.

FIG. 03a is an isometric view of the UV or NUV based color pixel backlight according to one embodiment of the present invention which is in continuation in part of the parent invention cited earlier.

FIG. 03b is a cross sectional view of one pixel taken across 3B-3B from FIG. 03a.

FIG. 03c is a cross sectional view of two pixels taken across 3C-3C from FIG. 03a.

FIG. 04 shows a cross sectional view of the embodiment of the present invention assembled in the 'edge-lit' configuration.

FIG. 05 shows the cross-sectional view of the assembly of the novel backlight of the present invention in a 'direct-lit' configuration.

FIG. 06 is a cut-away view of another embodiment of the present invention in a 'direct-lit' configuration.

DETAILED DESCRIPTION OF DRAWINGS

Figure 01A:
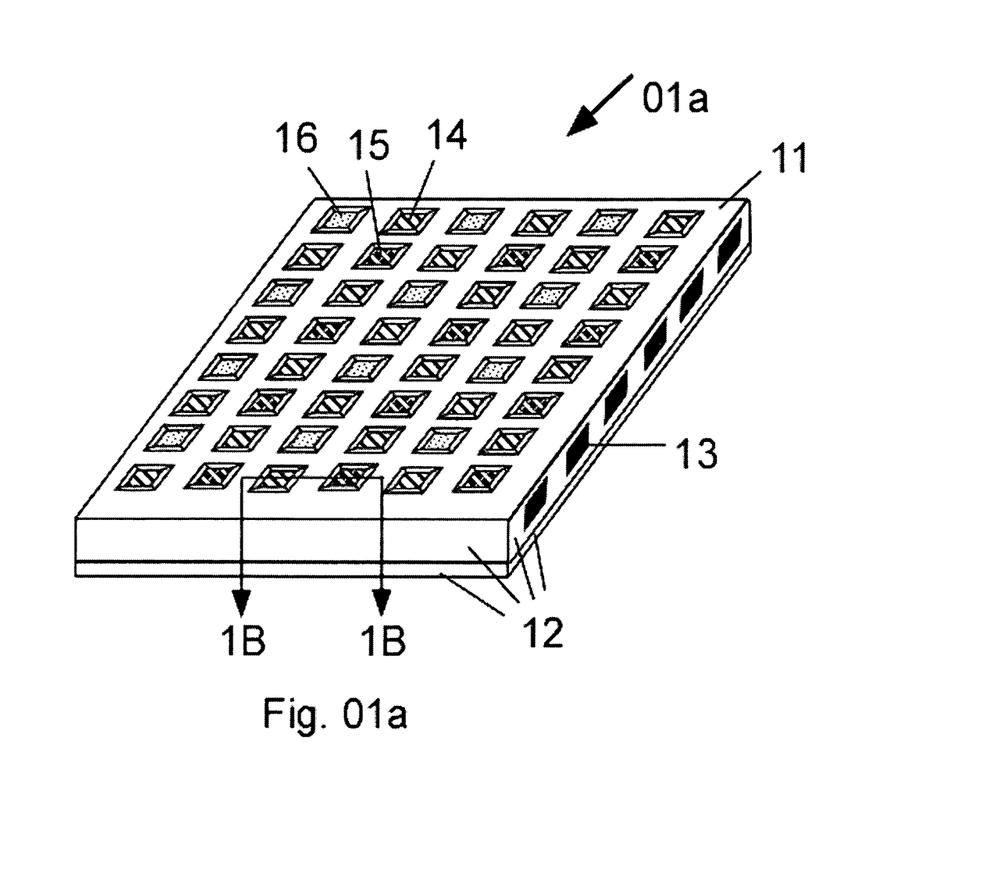
Figure 01B:
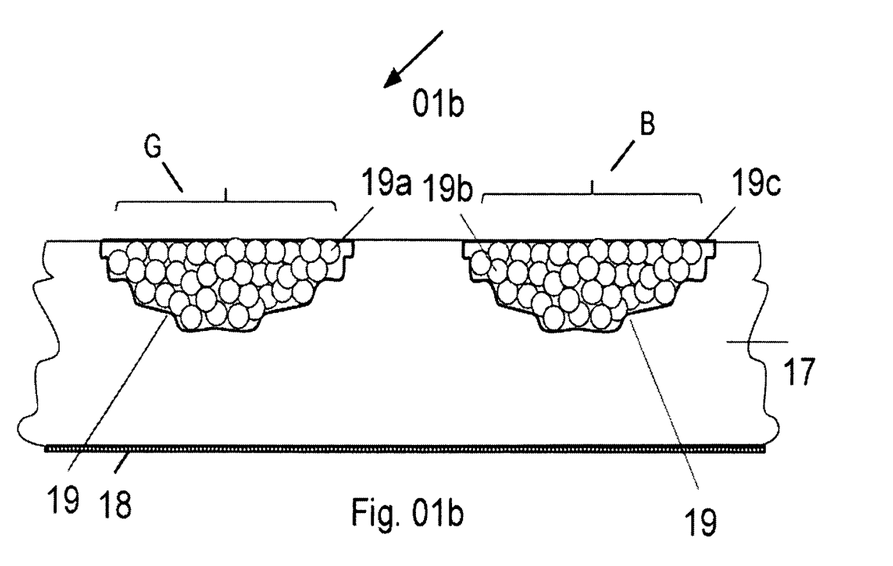
Figure 04:
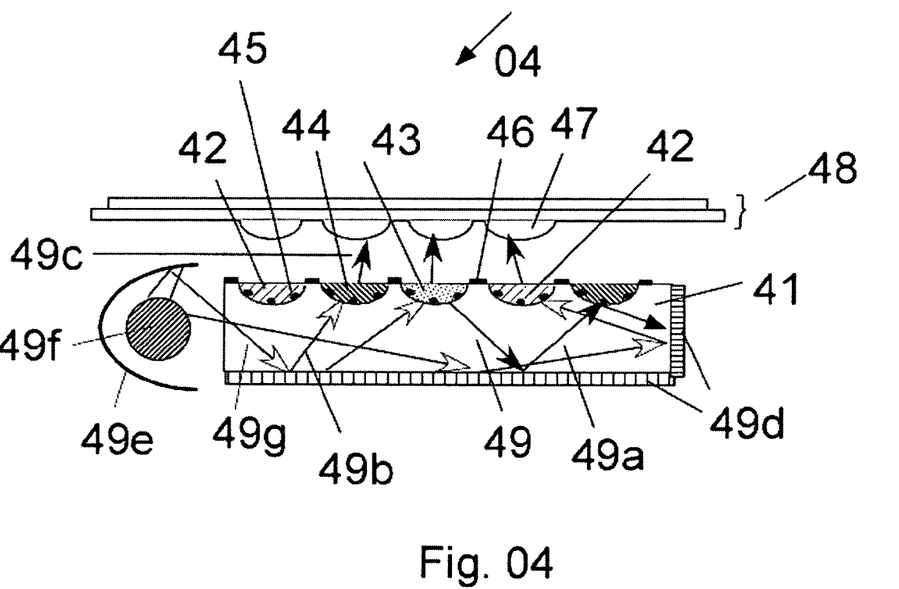

FIG. 01a is an isometric view of the color pixel backlight that incorporates UV or Near UV LEDs assembled at the edge of the light guide according to the parent invention (Munisamy Anandan—"UV based color pixel backlight for Liquid Crystal Display"—US-2009-008215-A1, application Ser. No. 12/220,736, filed on Jul. 28, 2008). The light guide 11, which is transmissive to UV or Near UV (NUV) light, has UV or NUV reflecting mirrors 12 made of material like Aluminum and is coated on all three edges except the portions on the edge where NUV or UV LEDs 13 are assembled adjacent to each other. The LEDs 13 are packaged inside a UV and NUV reflecting mirror (not shown in FIG. 01a) and the whole edge is covered with additional UV and NUV reflecting mirror, not shown in FIG. 01a. All other three edges of the light guide and the broad bottom surface are coated with UV and NUV reflecting mirror 12. The UV reflecting mirror is also NUV reflecting mirror and visible light reflecting mirror and is true in all the descriptions that follow. To obtain increased brightness of visible light from the phosphors, NUV LEDs can also be assembled on two edges or three edges or on all four edges of light guide provided all the edges where the UV or NUV LEDs are assembled transmit UV or NUV rays. The UV or NUV rays emitted by the LEDs travel in to the light guide and undergo total internal reflections on the broad faces of the light guide. However the UV or NUV rays are extracted at the regions where the light guide is etched or roughened to form pixels. The UV or NUV rays are not shown in FIG. 01a but better shown in FIG. 04. FIG. 01a also shows red phosphor pixel 16, blue phosphor pixel 15 and green phosphor pixel 14. The phosphor layers are deposited by the method of screen printing or ink-jet printing or spin coating followed by lithography over a roughened surface. The details of the pixels are better shown along the cross-section taken across 1B-1B and shown in FIG. 01b.

FIG. 01b is the cross-sectional view taken across 1B-1B of FIG. 01a. The rectangular slab of UV or NUV transmissive light guide 17 has a NUV and UV reflective coating 18 at the wide bottom surface. At the top surface the light guide 17 contains a green pixel G and Blue pixel B adjacent to each other. The phosphor pixel site G and B have etched surface 19, which is coated with green light emitting phosphor 19a at the green pixel site G, to emit green light if the NUV or UV rays fall on 19a. Similarly the etched surface 19 at the blue pixel site B is coated with phosphor 19b to emit blue light if the NUV or UV rays fall on 19b. The phosphor layers are protected at the top surface above the etched surface by a protective layer 19c to protect the phosphor from moisture, oxygen or other contaminants.

Figure 02:
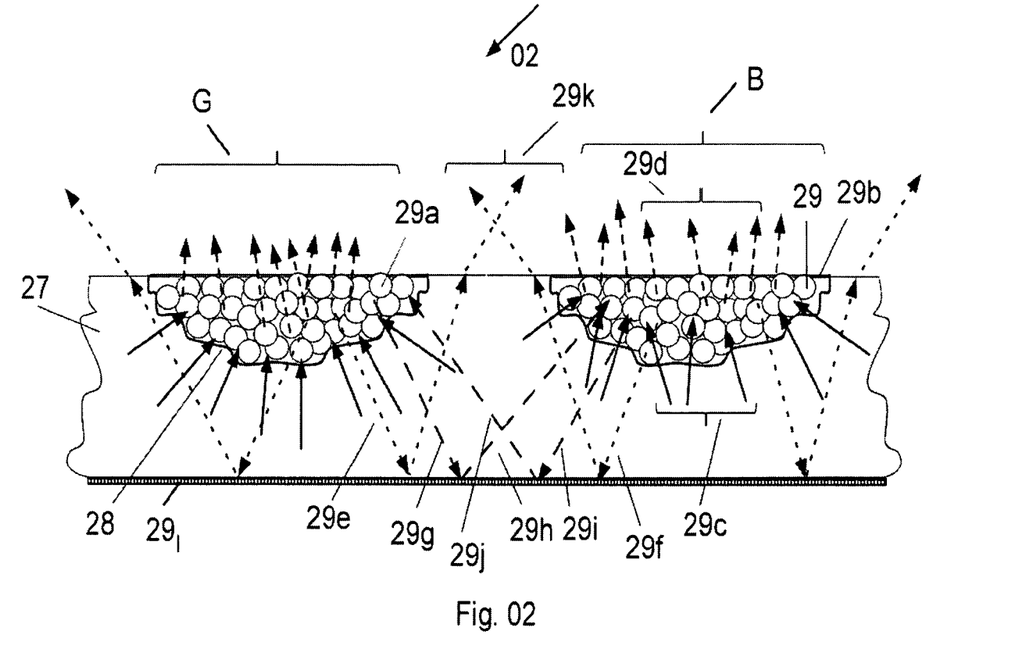

FIG. 02 is the cross-sectional view of the same pixels shown in FIG. 1b except that in FIG. 02 the path of UV or NUV rays and visible rays are illustrated to describe the concept of color mixing that takes place in the above referred parent invention. The light guide 27 which transmits UV, NUV and visible light rays contain green pixel site G and blue pixel site B adjacent to each other. A reflective coating $29_i$ that reflects UV, NUV and visible rays is at the wide bottom surface of the light guide. Above the reflector and well in to the light guide, an etched surface 28 is located and is shown for the pixel site G. A similar etched surface exists for the pixel site B but not labeled in the FIG. 02. The etched or roughened surface contains phosphor particles 29 at the blue pixel site and the particles 29 will emit blue light if UV or NUV is incident on the phosphor particle 29. Similarly the etched surface 28 at the pixel site G contains phosphor particles 29a that will emit green light if UV or NUV rays are incident on them. Both phosphor particles 29 and 29a has a protective layer 29b to protect the phosphor particles from moisture and contaminants. The UV or NUV rays 29c (solid arrows) extracted by the etched (roughened) surface 28 impinge on the phosphor particles 29. The path of these UV or NUV rays 29c from the UV or NUV LEDs (not shown in FIG. 02) is not shown in FIG. 02. When the UV or NUV rays incident on the phosphor particles, they excite the phosphor particles 29 to emit visible blue light 29d (dotted arrows pointing upwards). A similar phenomenon happens for the green pixel and the visible green light is produced as can be seen by the dotted arrows pointing upward at the site of the green pixels G. The visible rays emerging from the phosphor, as a result of NUV (or UV) excitation can travel in all directions The rays 29d emitted from the phosphor that travel towards the top of each pixel are the ones desired. The rays going down toward the bottom surface of the light guide are not desired. For example the visible rays 29e from green pixel site G and 29f from the blue pixel site B emitted by the phosphor upon UV or NUV excitation travel downward and get reflected at the bottom reflecting surface $29_i$ of the light guide 27 and emerge from the top surface of the light guide as 29k between the pixels. These rays are the mixture of green and blue light and are not useful, resulting in a loss. Tracing the ray 29g of green light coming out of green pixel G and traveling down the light guide, it gets reflected at the reflecting layer $29_i$ and travels toward the blue pixel B as ray 29h and gets mixed with the blue light emitted by blue pixel B. Similarly the blue light ray 29i coming out of the blue pixel B gets reflected at the reflecting layer $29_i$ and travels towards the green pixel G as ray 29j and gets mixed with the green light emitted by the green pixel G.

Thus the light coming out of the green pixel G is not pure green and the light coming out of the blue pixel B is not pure blue. This will not result in high color gamut for the LCD lit by this type of backlight. Hence this invention (Munisamy Anandan—"UV based color pixel backlight for Liquid Crystal Display"—US-2009-008215-A1) needs improvement in terms of color purity.

Figure 03A:
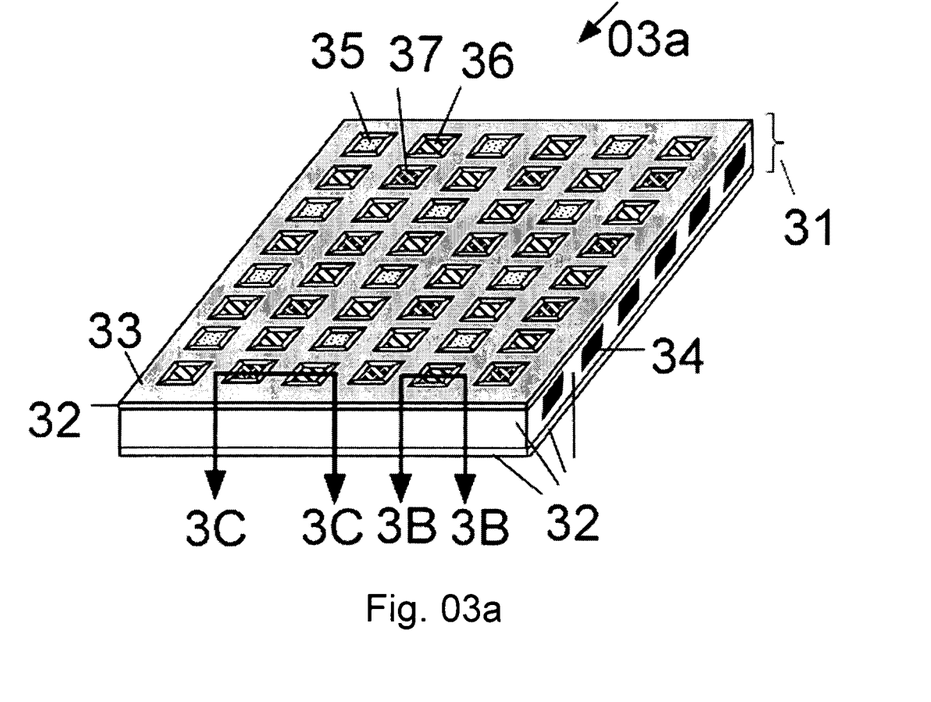

FIG. 03a is the isometric view of the color pixel backlight incorporating NUV LEDs or UV LEDs according to one embodiment of the present invention which is 'continuation in part' of the parent invention cited earlier in this specification. The light guide in this configuration is made of either borosilicate glass or quartz glass or Acrylic or plexiglass or any plastic material that has approximately 90% transmission for UV and NUV radiation. The rectangular planar light guide 31 has UV, NUV and visible light reflector 32 on all four edges of the light guide and at the bottom surface of the light guide. At the edge of the light guide where the NUV or UV LEDs 34 are assembled, the reflector 32 is not present in the regions occupied by the LEDs 34 to allow the UV or NUV rays emitted by the LEDs to enter the light guide. The package of UV or NUV LEDs is such that no NUV or UV comes out of the package but injected in to the rectangular light guide. In the illustration, only one edge of the light guide is assembled with NUV LEDs but they can be assembled on all four edges if need arises to increase the light output from the backlight. The LEDs 34 are packaged with heat sink and UV or NUV shielding (not shown in FIG. 3a) to prevent NUV or UV rays leaking to the backside of the LEDs which is non-emissive. The material of the reflector can be made of Al or silver or any multi-layer dielectric coating or 'UV blast' in the brand name of 'pro-tech' that is a pigmented paint that reflects UV and NUV or $MgF_2$ or calcium fluoride. A protective over-coating of $SiO_2$ over Al or silver can also be done. The top surface of the light guide is coated with the reflector 32 over all areas except the pixilated sites 35, 36 and 37. On top surface of the reflector 32, on the top surface of the light guide, is coated a black layer 33 that can be made of black resin containing black Titanium pigments or dry film black resist. The sequence of the coating is that a blanket layer of the reflector 32 is coated first on the flat top surface of the light guide, before the pixel sites are formed, followed by the blanket coating of black layer 33. The pixel sites are formed through photo-lithographic etching or sandblasting over these blanket layers. After the etching or sandblasting of the sites, a very thin film of Aluminum (not shown in FIG. 03a) to a thickness of less than 5 nm is vacuum evaporated selectively at the pixel sites so that the Aluminum film is not continuous and instead it has substantial porosities with island formation. The film need not be electrically conductive. After the super-thin Al film is formed, red, blue and green light emitting phosphors can be coated at respective sites to form R-G-G-B pixel pattern in a square format. FIG. 03a shows the red phosphor pixel 35, green phosphor pixel 36 and blue phosphor pixel 37. Other geometries other than square geometry can also be formed. Phosphor with R-G-G-B pattern can be obtained through one of the methods like, Ink-jet printing, electrophoretic coating or screen printing or spin coating followed by lithography.

Figure 03B:
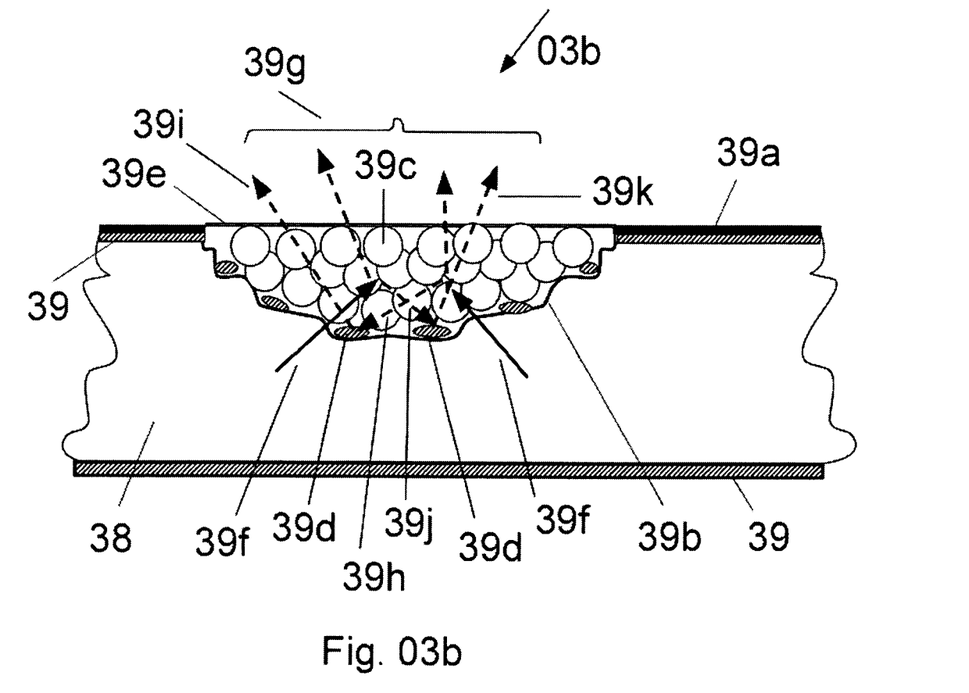

FIG. 03b is a cross-sectional view taken across 3B-3B from FIG. 03a. This shows the cross-section of a single pixel. The light guide plate 38 has a UN, NUV and visible ray reflector 39 both at the bottom surface as well as at the top surface. At the top surface the reflector is coated with a black layer 39a.

Figure 03C:
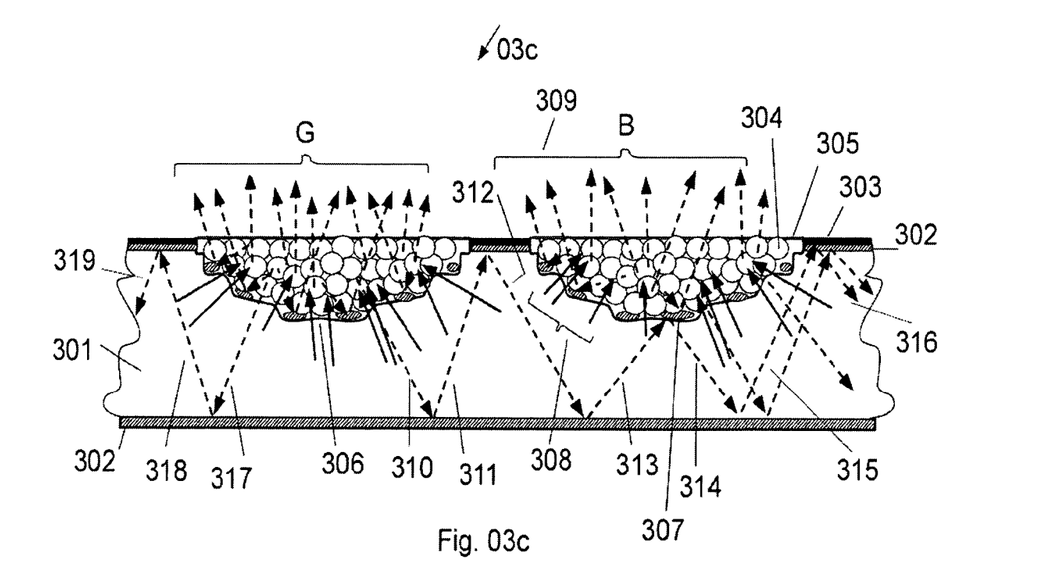

This black layer is for enhancing the contrast of LCD. The etched or roughened portion 39b contains the phosphor particles 39c which are covered by a protective coating 39e. In isolated regions there are Aluminum islands 39d formed by a thin coating of Al before the phosphor is deposited. The extracted NUV or UV rays 39f are incident on the phosphor. The principle of extraction of NUV or UV rays is not illustrated in the FIG. 03b. The NUV or UV rays incident on the phosphor particles 39c excite the phosphor particles and the phosphor particles under excitation emit visible light 39g traveling upwards. The visible light can travel in all directions. For example the visible light ray 39h travels towards Al island 39d and gets reflected as visible ray 39i. Similarly the visible ray 39j travels towards Al island 39d and gets reflected as visible ray 39k. In the absence of Al island, the rays 39h and 39j would have traveled further down and gotten reflected by the reflector 39 at the bottom surface of the light guide 38. After reflection there is a possibility of the visible ray entering the adjacent pixel. Further description of this situation is illustrated in FIG. 03c. Another important point to note about the Al island is the thickness of the Al layer. In the foregoing description it was stated that Al layer can be as thin as 5 nm to have island formation with full of porosity. The thin layer can, not only reflect but can also transmit both the NUV rays and visible rays. The visible rays should not be transmitted down the light guide instead the visible rays should all be reflected by Al. An alternate method of forming Al layer of sufficient thickness of say more than 100 nm is to deposit the Al layer as a blanket film through vacuum evaporation to a thickness exceeding 100 nm followed by selective sand-blasting, employing a 'blast-mask', of thick Al film to create pores. Reflector 39 can also be formed simultaneously by this method. Alternate method of creating porosity is through photo-lithographic process of etching Al layer using a suitable litho-mask. In the case of photolithographic etching one can control the porosity. Reflector 39 can also be formed simultaneously by this method. Still another alternate method of forming porous Al layer of thickness in the range from 5 nm to 500 nm is to employ a shadow mask and evaporate Al by vacuum evaporation through the shadow mask. Yet another method of obtaining thick and porous Al layer is by employing 'resist lift-off lithography'. In this method a negative resist is used to pattern holes in the resist followed by vacuum evaporation of thick >100 nm of Al and finally lifting-off the resist portion. Al islands of 5 micron size can easily be obtained by this method. Reflector 39 can also be formed simultaneously by this method. In all the methods of the formation of Al islands, an adhesion layer of less than 5 nm of Chromium prior to the vacuum evaporation of Al can be done if necessary. Alternate material for reflecting visible light is by the use of multi-layer dielectric film as reflector ((M. Anandan et. al—"Design of Multi-channel flat fluorescent lamp for Avionic LCD backlighting" IEEE Transaction of Electron Devices, pp. 504-510, vol. 41, Issue No. 4, 1994). This film can replace Al layer.

FIG. 03c shows the cross-sectional view of two pixels taken across 3C-3C from FIG. 03a. This Figure illustrates the suppression of color mixing and thus provides improvement over the parent invention cited in the beginning of this specification. The two adjacent pixels shown are the green light emitting pixel G and the blue light emitting pixel B. The light guide 301 has NUV, UV and visible light reflecting layer 302 at the bottom surface and the same reflecting layer 302 at the top surface in selected area. The top reflector surface is coated with a black layer 303. The etched or roughened surface 306 contains the phosphor particles 304 which are covered by a protective layer 305 for protecting the phosphor particles against moisture and foreign particle contamination. The porous Al layer 307 is at the bottom of the phosphor layer next to the etched or roughened surface 306. The NUV or UV rays 308 extracted by the roughened surface of the pixel B is incident on the phosphor particles 304 and excites the phosphor particles 304 that emit blue light upon excitation. The blue light 309 is emitted from the blue pixel B as a result of the NUV or UV excitation. Similar phenomenon takes place at the green pixel site G. The visible rays emitted by the pixel G and B can travel in all directions. For example, the green light ray 310, emitted by the green pixel, travels towards the bottom of the light guide and gets reflected at the reflector 302 and travel upwards as reflected ray 311. Upon reflection at the top reflector, it travels down as reflected ray 312 till it faces the bottom reflector 302 again. Upon reflection at the bottom reflector, it travels upward as the reflected ray 313 till it meets the Al island 307. At the Al island it gets reflected again, without going in to the blue pixel, as ray 314. For complete reflection the thickness of Al should exceed 100 nm. Thus color mixing of green color light in to blue color light is suppressed. By continuing to trace the ray 314, it can be seen that the the ray 314 turns in to reflected ray 315 upon reflection at the bottom reflector 302 and further reflected away as ray 316 after getting reflected at the top reflector 302. There is multiplicity of rays like the one described in this example. The example shows that the visible rays do not emerge in the region between pixels and the visible ray emitted by one pixel is not entering the adjacent pixel. Additional illustration can be seen by tracing the visible green light ray 317 emitted by the phosphor of the green pixel G. The ray 317 travels down and gets reflected at the reflector 302 of the bottom surface and travels upwards as ray 318. Upon incident at the top reflector 302 it is reflected away as reflected ray 319. The rays 310, 311, 312, 313, 314, and 316 show that the mixing of colored light from the green pixel to the blue pixel is suppressed and the light emerging between the pixels is eliminated. The Al islands play a critical role in suppressing the color mixing of light rays from adjacent pixels. The rays 317, 318 and 319 show that the visible light emerging between the pixels, is eliminated.

FIG. 04 shows a cross sectional view of the assembly of 'edge-lit' configuration of the backlight according to the present invention. This is the assembly of UV or NUV LED based backlight in edge-lit configuration that is assembled and placed in substantial alignment with a Liquid Crystal Display 48 that does not require color filters, and a micro-lens sheet 47, also called 'lenticular' sheet. The novel backlight comprises red pixel site 42, blue pixel site 44 and green pixel site 43. These pixel sites are formed by roughening the top surface of the light guide 41 by etching or sand blasting and then coating the roughened (for simplicity the roughened profile is omitted in the FIG. 04) site with the appropriate color phosphor. The structure of the pixel site comprises Aluminum layer in the form of islands 45 and UV, NUV and visible light reflector 46 that has an overcoat of a black layer (not shown for simplicity). The NUV or UV rays originate from UV or NUV LED 49f and upon reflection at the parabolic reflector 49e get injected in to the light guide 41. One example is the ray entering the light guide as 49g and gets reflected at the UV, NUV and visible light reflector 49d at the bottom surface of the light guide and entering the blue pixel site 44 as 49b. This results in the excitation of blue phosphor that emits blue light rays 49c in this example. This blue ray 49c falls on the micro-lens sheet 47 and is collimated to the intended blue pixel of LCD. The illustration also shows the suppression of color mixing through the ray 49 traveling down as green color ray of light and gets reflected at the UV, NUV and visible light reflector 49d. After reflection the ray travels as 49a and is incident on the Aluminum island and gets reflected away by Al. Thus the mixing of green light in to the blue pixel is suppressed.

Figure 05:
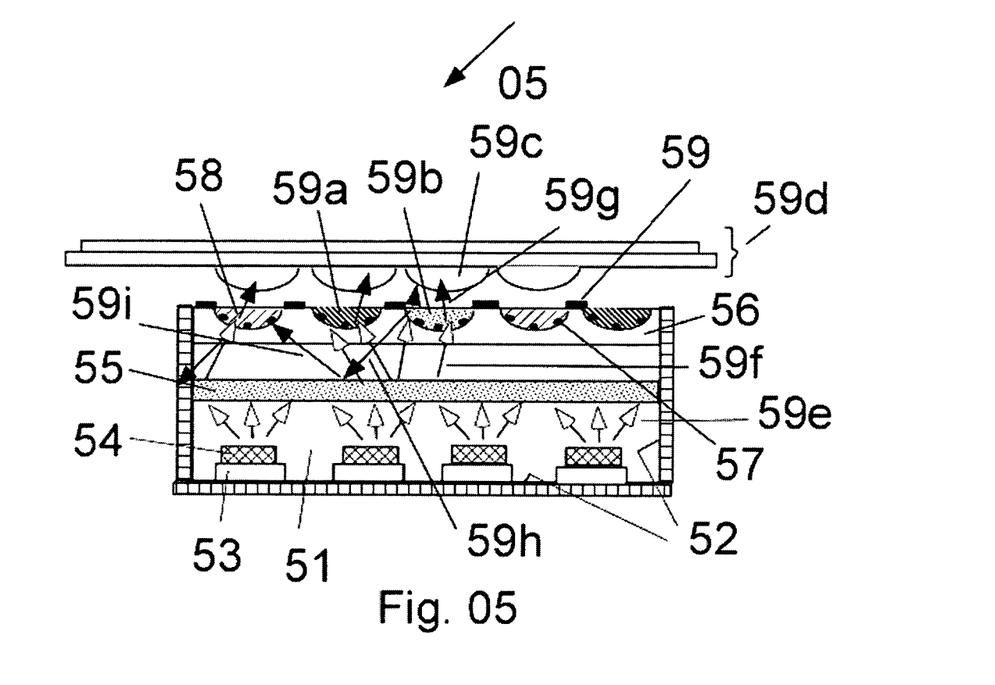

FIG. 05 shows the cross-sectional view of the assembly of the novel backlight of the present invention in a 'direct-lit' configuration of UV-NUV based color pixel backlight. The backlight box 51 has UV, NUV and visible ray reflector 52 on all five inside surfaces. UV or NUV LEDs 54 with its heat sink 53, are assembled at the bottom of the backlight box. A UV or NUV diffuser plate 55 such as a fused silica, with 35 micron ground diffusing surface, is assembled at a level higher than the LEDs to diffuse the UV or NUV rays 59e, emitted by the LEDs 54, uniformly upward as rays 59f. At a higher level than the UV or NUV diffuser plate 55 is assembled a light guide plate 56 that that transmits UV or NUV rays and contains the red pixel site 58, blue pixel site 59a and green pixel site 59b. Between the pixels there is a reflector 59 with black layer on top (the black layer is not shown in FIG. 05). In the example shown in FIG. 05, the UV or NUV ray 59f excites the phosphor contained in the green pixel site and this produces the emission of green light ray 59g. A similar phenomenon takes place for all pixels. Solid arrows represent visible light rays. The suppression of color mixing is also illustrated in FIG. 05. For example the green light ray 59h emitted from green pixel 59b travels down and gets partially reflected as ray 59i and gets blocked by Al island 57 and reflected away (the reflected ray is not shown in FIG. 05 for simplicity). The backlight box 51, the micro-lens sheet 59c and the LCD 59d are placed in substantial alignment to make the light emitted by the color pixels of the light guide to go through the pre-determined pixels of LCD thus providing a 'color pixel backlight'.

Figure 06:
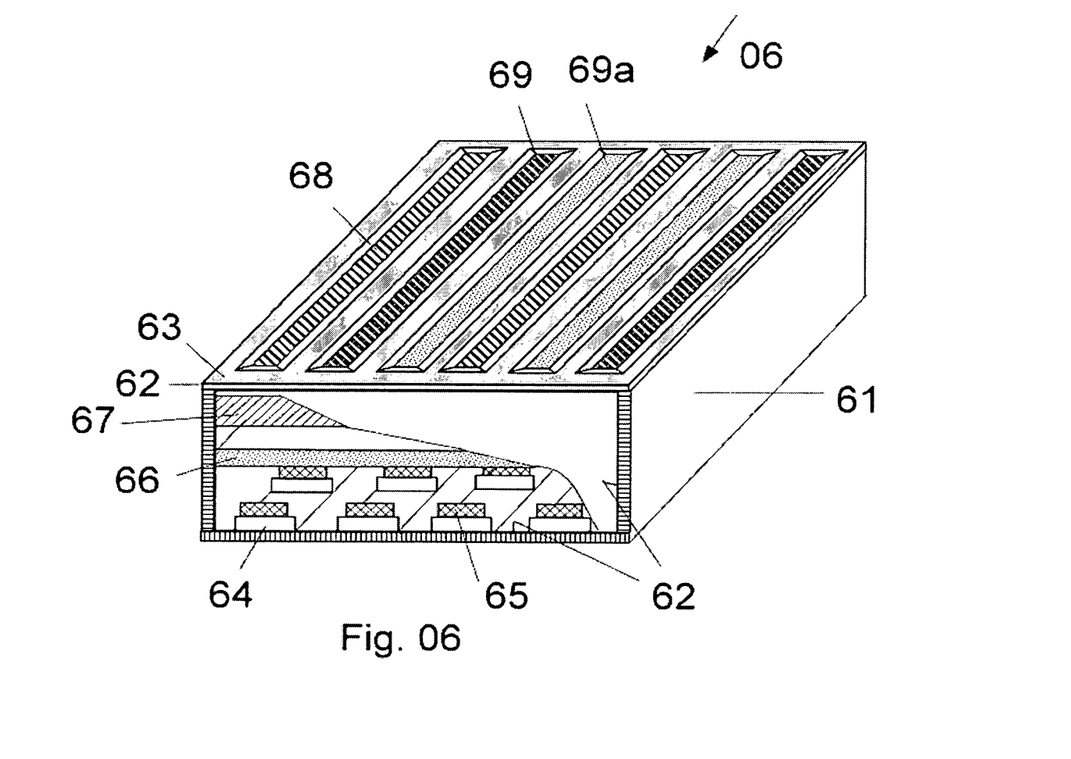

FIG. 06 shows the cut-away view of another embodiment of the present invention. The backlight box 61 has all the five inside surfaces coated with UV and NUV reflector 62. At the bottom side of the box is assembled UV or NUV LEDs 65 with its heat sink 64. At a higher level than the LEDs, a UV and NUV diffuser plate 66, such as fused silica with 35 micron ground surface for diffusing UV or NUV rays is assembled. At a higher level than the UV or NUV diffuser plate is assembled a planar light guide 67 that transmits UV and NUV rays and contains striped channels 68, 69 and 69a. The channels contain different phosphors that emit different colors of light under UV or NUV excitation. For example red light emitting phosphor is contained in the channel 68, the blue light emitting phosphor is contained in the channel 69 and green light emitting phosphor is contained in channel 69a. A double layer containing UV and NUV reflector 62 and a black layer 63 is coated on the top surface of the light guide in all areas except the area occupied by the channels 68, 69 and 69a. The backlight box shown in FIG. 06 can be kept in substantial alignment with a micro-lens sheet (not shown in FIG. 06) and an LCD without color filters (not shown in FIG. 06) so that the different colored light from the channels pass through the intended pixels of LCD. This is similar to the description given under FIG. 05.

It will be understood that one skilled in the art could modify the above basic design, geometries, sequence of assemblies, materials, processes and components. Various modifications and variations can be made in the construction, configuration, applications and/or operation of the present invention without departing from the scope or spirit of the invention. By way of examples, (i) the description of phosphor in the illustrations is generally about red, blue and green phosphor but this can be altered to specific compositions for red, blue and green phosphors as well as the addition of a white pixel of phosphor (ii) the NUV LEDs described are those whose peak wavelength is in the neighborhood of 360 nm but this can be altered to have peak wavelength less than 360 nm and more than 360 nm (iii) the backlight box in 'direct-lit' configuration shows the UV and NUV reflectors, UV and NUV diffusers and heat sink but this can be modified to include many additional UV or NUV optical elements to obtain more uniform UV or NUV rays that can strike the phosphor to obtain uniform colored visible light (iv) the light guide structures described are provided with basic reflectors but this can be modified to have reflector patterns and multi-layer coatings of reflectors made of metallic and dielectric films (vi) the coupling element described to couple light from color phosphors to LCD with good alignment is a sheet of micro-lens but this can be modified to include other optical elements such as prism sheet (vii) the light guide described with one edge assembled with UV or NUV LEDs but this can be modified to have NUV LEDs assembled on two edges or three edges or four edges of light guide. For suppressing the color mixing Al islands are employed in this invention. This could be modified to multi-layer dielectric film with controlled porosities. The Al islands are formed in this invention with random orientation but this could be modified to have fixed space between the islands. The space between the islands and the thickness of Al layer can be optimized to allow more UV or NUV flux to pass through and at the same time suppress visible light to escape sideward or downward from the pixel site in addition to blocking the visible light from adjacent pixels to enter the site. The present inventions describes the roughened surface through etching or sand-blasting and then coating a porous thin Al islands over which is coated phosphor layer. One can avoid the roughening of the surface and coat the Al islands followed by phosphor. This will still yield color pixilated backlight with lower efficiency but can simplify the process. The present invention is based on the UV or NUV emitting LEDs injecting UV or NUV rays in to the light guide. One can also employ blue LEDs which emit radiation in the blue region with a peak wavelength of 450 nm and still obtain color pixel backlight with the foregoing description. Thus it is intended that the present invention covers the modifications and variations of the invention provided they come within the scope of the appended claims and their equivalents.

I claim:

1. A novel LED based color-pixel backlight system, with suppression of color mixing, for color filter-less liquid crystal display, comprising:
   a light guide, having four edges and two broad surfaces, with at least one edge transmitting UV or NUV rays and assembled with a multiplicity of UV or NUV emitting LEDs and the other three edges, opposite to and adjacent to the transmitting edge, coated with reflector, reflecting UV, NUV and visible rays, with its bottom broad surface coated with UV, NUV and visible light reflecting mirror and its top broad surface roughened through etching or other means to create pixelated square patterns for extracting UV or NUV light from the light guide;
   said light guide having its top broad surface coated with two layers one over the other, comprising a reflective layer at the bottom and a black layer at the top of the reflective layer;
   said two layers being coated everywhere except in the pixelated areas;
   means for connecting said UV or NUV LEDs to electrical power to emit UV or NUV radiation;

said etched square patterns containing aluminum islands with a coating of phosphor layers on top of aluminum islands and the phosphor layers having a protective coating on their top surface;

said aluminum islands reflecting the visible light generated within the pixel and suppressing the different color of visible light, other than the color of light generated within the pixel, entering the pixel either directly from adjacent pixels or through multiple reflections at the internal surfaces of the light guide from other pixels;

said aluminum islands having sufficient space between them allowing sufficient UV or NUV rays entering the pixel;

said phosphor layers containing red, blue and green phosphors that convert the UV or NUV rays incident on them in to visible red, blue and green colors of light, with pixel patterns, that travel upward towards a sheet of micro-lens;

said sheet of micro-lens, said etched pattern on the surface of the light guide and the color filter-less LCD, are all assembled such that the said sheet of micro-lens, said etched pattern on the surface of the light guide and the LCD are kept substantially in alignment to provide color pixel backlighting to the said color filter-less LCD.

2. A novel LED based color-pixel backlight system for color filter-less liquid crystal display, as claimed in claim 1 wherein the said light guide is made of UV and NUV transmitting quartz glass or borosilicate glass or plexi glass or acrylic or any plastic material that has a transmission of at least 50% for UV and NUV radiation.

3. A novel LED based color-pixel backlight system for color filter-less liquid crystal display, as claimed in claim 1 wherein the said aluminum islands have thickness in the range of 1 nm to 500 nm.

4. A novel LED based color-pixel backlight system for color filter-less liquid crystal display, as claimed in claim 3 wherein the aluminum islands are created by photo-lithographic process or vacuum evaporation process or sputtering process using shadow mask.

5. A novel LED based color-pixel backlight system for color filter-less liquid crystal display, as claimed in claim 1 wherein the said reflective islands are made of reflective dielectric layers that are reflective for visible light and transmissive for UV and NUV rays.

6. A novel LED based color-pixel backlight system for color filter-less liquid crystal display, as claimed in claim 1 wherein the said phosphor layers emit sharp spectrum in red light, blue light and green light with half width at full maximum of less than 30 nm.

7. A novel LED based color-pixel backlight system for color filter-less liquid crystal display, as claimed in claim 1 wherein the said patterns on the said light guide are in the form of squares or rectangles or triangles or stripes or any polygon.

8. A novel LED based color-pixel backlight system for color filter-less liquid crystal display, as claimed in claim 1 wherein the said LEDs are blue light emitting LEDs.

9. A novel LED based color-pixel backlight system, with suppression of color mixing, for color filter-less liquid crystal display, comprising:
  a light guide, having four edges and two broad surfaces, with its four edges transmitting UV or NUV rays and assembled with multiplicity of UV or NUV emitting LEDs with its bottom broad surface coated with UV, NUV and visible light reflecting mirror and its top broad surface roughened through etching or other means to create pixelated square patterns for extracting UV or NUV light from the light guide;
  said light guide having its top broad surface coated with two layers one over the other, comprising a reflective layer at the bottom and a black layer at the top of the reflective layer;
  said two layers being coated everywhere except in the pixelated areas;
  means for connecting said UV or NUV LEDs to electrical power to emit UV or NUV radiation;
  said etched square patterns containing aluminum islands with a coating of phosphor layers on top of aluminum islands and the phosphor layers having a protective coating on their top surface;
  said aluminum islands reflecting the visible light generated within the pixel and suppressing the different color of visible light, other than the color of light generated within the pixel, entering the pixel either directly from adjacent pixels or through multiple reflections at the internal surfaces of the said light guide from other pixels;
  said aluminum islands having sufficient space between them allowing sufficient UV or NUV rays entering the pixel;
  said phosphor layers containing red, blue and green phosphors that convert the UV or NUV rays incident on them in to visible red, blue and green colors of light, with pixel patterns, that travels upward towards a sheet of micro-lens;
  said sheet of micro-lens, said etched pattern on the surface of the light guide and the color filter-less LCD, are all assembled such that the said sheet of micro-lens, said etched pattern on the surface of the light guide and the LCD are kept substantially in alignment to provide color pixel backlighting to the said color filter-less LCD.

10. A novel LED based color-pixel backlight system for color filter-less liquid crystal display as claimed in claim 9 wherein the said light guide has three edges transmitting UV and NUV rays and assembled with UV or NUV LEDs and the remaining fourth edge is coated with UV and NUV reflecting mirrors.

11. A novel LED based color-pixel backlight system for color filter-less liquid crystal display as claimed in claim 9 wherein the said light guide has two edges transmitting UV and NUV rays and assembled with UV or NUV LEDs and the remaining two edges are coated with UV and NUV reflecting mirror.

12. A novel LED based color-pixel backlight system for color filter-less liquid crystal display, comprising:
  a backlight box having five surfaces with all the five internal surfaces being provided with UV and NUV reflectors with bottom broad surface containing multiplicity of UV or NUV emitting LEDs packaged to heat dissipating structures;
  means for connecting UV or NUV LEDs to electrical power to emit UV or NUV radiation;
  said backlight box containing a UV and NUV diffuser plate spaced above the said UV or NUV LEDs and diffusively and uniformly transmitting UV or NUV rays towards a UV and NUV transmitting light guide plate;
  said UV and NUV transmitting light guide plate having its top broad surface roughened through etching or other means to create pixelated square patterns for extracting UV or NUV rays and the remaining areas on the top broad surface coated with UV and NUV reflecting layer with a black layer on top of UV and NUV reflecting layer;

said etched square patterns containing aluminum islands with a coating of phosphor layers on top of aluminum islands and the phosphor layers having a protective coating on their top surface;

said aluminum islands reflecting the visible light generated within the pixel and suppressing the different color of visible light, other than the color of light generated within the pixel, entering the pixel either directly from adjacent pixels or through multiple reflections at the internal surfaces of the said backlight box from other pixels;

said aluminum islands having sufficient space between them allowing sufficient UV or NUV rays entering the pixel;

said phosphor layers containing red, blue and green phosphors that convert the UV or NUV rays incident on them in to visible red, blue and green colors of light, with pixel patterns, that travels upward towards a sheet of micro-lens;

said sheet of micro-lens, said etched pattern on the surface of the said UV and NUV transmitting light guide plate and the LCD are all assembled such that the said sheet of micro-lens, said etched pattern on the surface of the said UV and NUV transmitting light guide plate and the LCD are kept substantially in alignment to provide color-pixel backlighting to the said color filter-less LCD.

13. A novel LED based color-pixel backlight system for color filter-less liquid crystal display, as claimed in claim 12 wherein the said UV and NUV transmitting light guide plate is made of UV and NUV transmitting quartz glass or borosilicate glass or fused silica or plexi glass or acrylic with substantial transmission of at least 50% in UV and NUV wavelengths.

14. A novel LED based color-pixel backlight system for color filter-less liquid crystal display, as claimed in claim 12 wherein the said aluminum islands have thickness in the range of 1 nm to 500 nm.

15. A novel LED based color-pixel backlight system for color filter-less liquid crystal display, as claimed in claim 14 wherein the aluminum islands are created by photo-lithographic process or vacuum evaporation process or sputtering process using shadow mask.

16. A novel LED based color-pixel backlight system for color filter-less liquid crystal display, as claimed in claim 14 wherein the said reflective islands are made of reflective dielectric layers that are reflective for visible light and transmissive for UV and NUV rays.

17. A novel LED based color-pixel backlight system for color filter-less liquid crystal display, as claimed in claim 12 wherein the said phosphor layers emit sharp spectrum in red light, blue light and green light with half width at full maximum of less than 30 nm.

18. A novel LED based color-pixel backlight system for color filter-less liquid crystal display, as claimed in claim 12 wherein the said etched patterns on the said light guide are in the form of squares or rectangles or triangles or stripes or any polygon.

19. A novel LED based color-pixel backlight system for color filter-less liquid crystal display, as claimed in claim 12 wherein the said LEDs are blue light emitting LEDs.

* * * * *